Nov. 15, 1938.    B. B. OWENS    2,136,707
VALVE
Filed May 31, 1935
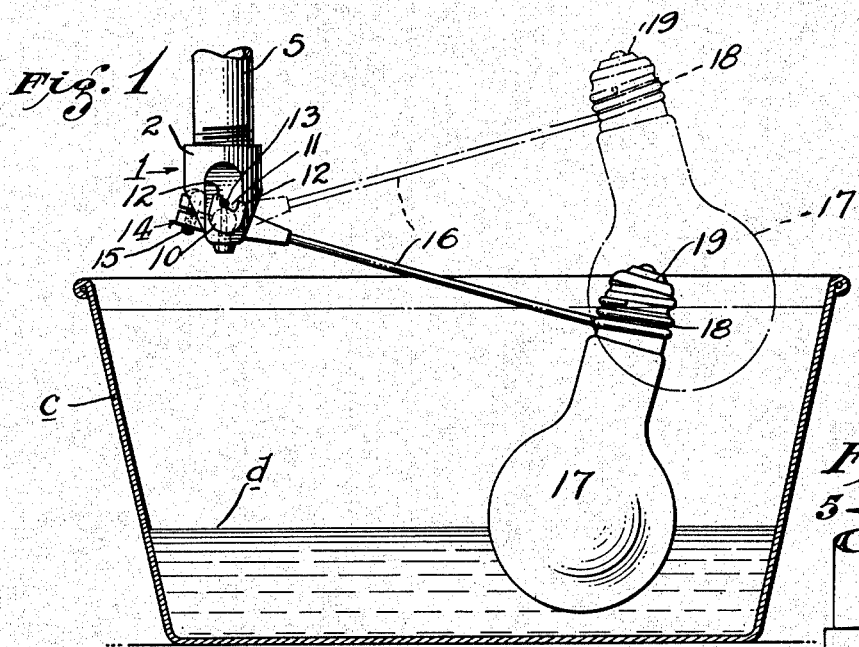
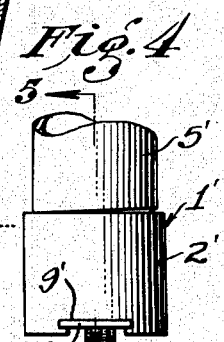
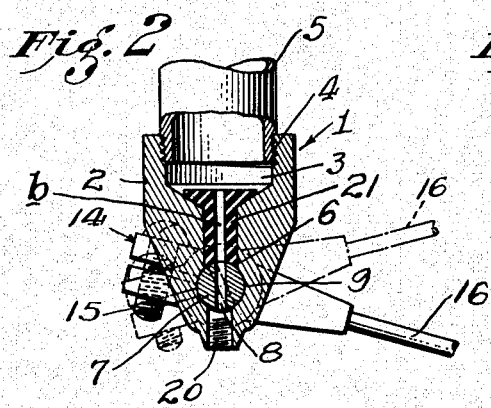
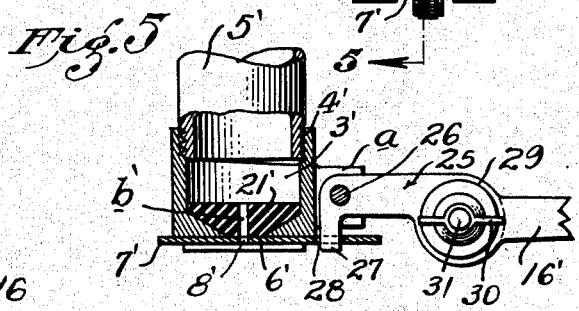
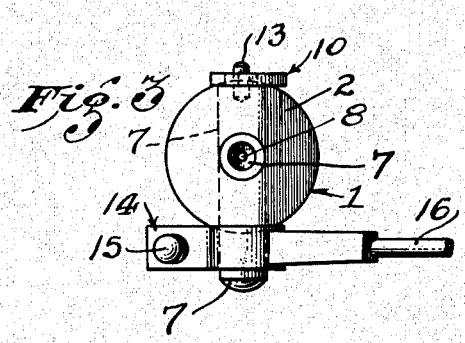
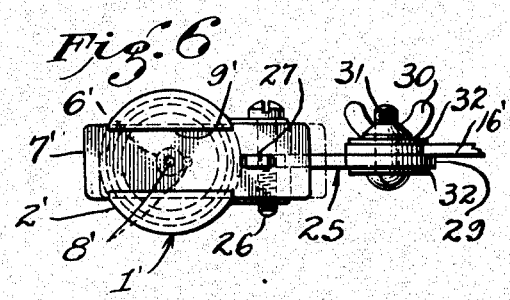
INVENTOR
Bengeman Beason Owens.
BY
*his* ATTORNEY.

Patented Nov. 15, 1938

2,136,707

UNITED STATES PATENT OFFICE 2,136,707

VALVE

Bengeman Beason Owens, Van Nuys, Calif., assignor to Bank of America National Trust and Savings Association, Los Angeles, Calif., a National Banking Association Application May 31, 1935, Serial No. 24,329

2 Claims. (Cl. 251—113)

This invention relates to valves and more particularly to a fluid control valve.

An object of my invention is to provide a novel valve in which the working parts thereof need not be accurately fitted, but which will provide a water tight seal when the valve is moved to closed position.

Another object of my invention is to provide a simple, inexpensive, but highly efficient valve for controlling the flow of liquids and in which the pressure of the liquid aids in forming a liquid tight fit when the same is moved to closed position.

Other objects, advantages and features of invention may appear from the accompany drawing, the subjoined detail description and the appended claims.

The accompanying drawing illustrates the invention in some of the forms I at present deem preferable.

Figure 1 is a side elevational view of my valve associated with a container which is shown in section. Dot and dash lines indicate a moved position of the valve control when the basin has obtained a predetermined quantity of water.

Fig. 2 is an axial sectional view of the valve shown in Fig. 1 and dot and dash lines indicate the valve moved to closed position. The control arm is broken away to contract the view.

Fig. 3 is a bottom plan view of the valve shown in Figs. 1 and 2. The control arm is broken away to contract the view.

Fig. 4 is an end elevational view of a modified form of my novel valve.

Fig. 5 is an axial sectional view taken on line 5—5, Fig. 4. Parts are broken away to contract the view.

Fig. 6 is a bottom plan view of the valve shown in Figs. 4 and 5. Parts are broken away to contract the view. Dot and dash lines indicate the valve in closed position.

My valve 1, shown in Figs. 1–3, comprises a valve body 2 that is provided with a bore 3 that is internally threaded at one end, as at 4, for threaded engagement with a supply pipe 5 that may be connected, as for example, to usual water supply pipe lines. The other end of bore 3 is provided with a reduced opening 6, across which a movable control member 7 extends so as to permit the port 8 therein to be moved into and out of register with opening 6, to thereby permit and prevent flow of liquid past member 7 from the source of supply.

The control member 7 is preferably a pin that is rotatably mounted in a transverse bore 9 formed in body 2 and has an integral extension 10 at one end that is provided with a recess 11 thereby forming two upstanding lugs 12 that straddle a pin 13 and thereby limit the rotational movement of the member 7. The other end of member 7 opposite extension 10 extends from the valve body where a split clamp 14 engages the same and is adjustably mounted thereon by means of the clamp screw 15.

A control arm 16 extends from clamp 14 and is provided at its free end with a float securing means that may be in the nature of an electric light bulb 17 that is threaded into engagement with the arm 16 which may have its free end coiled as at 18 to provide a threaded socket for receiving the usual threaded end 19 of the bulb 17.

The free end of opening 6 may be threaded as at 20 to provide means for connecting an extension pipe thereto.

A packing or non-metallic plug 21 is mounted in opening 6 and such packing 21 may be of any suitable material such as rubber, that is sufficiently hard to permit the pin 7 to rotate in bore 9 without the same binding and which is also sufficiently pliable so that when pin 7 is moved to closed position the pressure of the liquid from the source of supply will urge the packing against the pin 7 to form an effective liquid tight joint. The packing 21 has a head that is tapered on its underside and is adapted to rest upon the tapered shoulder that extends from the side walls of the bore to the reduced opening 6, and said plug 21 is provided with an aperture $b$ extending therethrough which registers with port 8 when the valve is moved to open position.

In the modified construction shown in Figs. 4–6, the valve body 2' is provided with a bore 3' that is internally threaded at one end as at 4' for threaded engagement with a supply pipe 5'. The other end of bore 3' is provided with an opening 6' across which a movable control member 7' extends so as to permit the port 8' therein to be moved into and out of register with opening 6' to thereby permit and prevent flow of liquid past member 7 from the source of supply.

In the construction shown in Figs. 4–6, the control member 7' is preferably a flat member that is slidably mounted in a guideway such as a T-slot 9' formed in the bottom of the body 2'. The body 2' is provided with projecting lugs $a$ between which a bell-crank lever 25 is pivotally mounted as at 26 and one end 27 of such bell crank 25 extends into a slot 28 formed in control member 7'. The other end 29 of bell crank 25 is connected to one end of control arm 16' by means of the wing nut 30 that is threaded on the bolt 31 and bolt 31 and wing nut 30 coact with washers 32 to effectively secure control arm 16' in adjusted position relative to bell crank 25. The other end of control arm 16' may be provided with any suitable means to receive a float which coacts with the control arm to move the control member 7 as will be apparent.

The packing 21' is mounted in the valve body 2' so that the same extends into opening 6' and such packing is preferably of the same material as hereinbefore described, that is used for the packing 21 and will operate in a manner analogous to the packing 21 to effectively form a liquid tight connection between the movable member 6' and such packing to effectively shut off the liquid supply when the valve is moved to closed position.

It will be apparent from the foregoing that by providing a packing as herein described, that the movable member of the valve does not have to be tightly fitted into the valve body in order to form a valve of this character which when closed does not leak.

In operation it will be apparent that when my valve is used to control a water supply into a pan c that the float 17 will be raised or lowered depending upon the water level d to thereby open and close the valve.

It will be understood to those skilled in the art that although I have shown my valve associated with a pan c in Fig. 1 to control a water level my valve may be used in any place in association with a float or float means whereby a water level is desired to be maintained or controlled and this may be in connection with a pan c as shown for use as a drinking fountain; or in association with any other chamber or receptacle for a body of water, such as the water tanks for toilet bowls.

It will also be apparent that my valve may be used in connection with the flow of fluids such as gas or air, and although I have used the term "liquid" the same shall be understood to mean either air, gas, water, or any other like or analogous fluids or liquids, the flow of which is desired to be controlled, whether with or without a float means, without departing from the spirit and scope of my invention.

I claim:

1. A valve comprising a valve body provided with a bore for communication with a source of liquid supply and having a tapered shoulder within said bore; a relatively long non-metallic plug inserted in said bore and having one end enlarged to form a head adapted to rest on said shoulder, said plug being provided with an aperture therethrough; and a closure member having a port for registry with said aperture the face on said plug head nearest said closure member being tapered to engage the tapered shoulder in said bore, said closure member being contacted by said plug and said plug being so constructed and arranged that pressure of liquid in said bore will normally urge said plug against said closure member to form an effective liquid tight seal when said port is moved out of registry with said aperture.

2. A valve comprising a valve body provided with a bore to be connected to a source of fluid supply; a movable control member extending across said bore and provided with a port to be moved into and out of registry with said bore; a tapered shoulder within said bore between said closure member and the source of fluid supply; a relatively long cylindrical non-metallic plug mounted in said bore and having the periphery at one end thereof enlarged to form a head with its annular face nearest the control member tapered to engage said tapered shoulder and provided with an aperture through said plug and with which the port of said control member is adapted to register; said plug being of pliable material that when said control member is moved to closed position, the pressure of liquid from the source of supply will urge said plug against said member to form an effective liquid tight seal.

BENGEMAN BEASON OWENS.